(12) United States Patent
Duval

(10) Patent No.: US 7,903,813 B2
(45) Date of Patent: *Mar. 8, 2011

(54) STREAM CIPHER ENCRYPTION APPLICATION ACCELERATOR AND METHODS THEREOF

(75) Inventor: Donald E. Duval, Santa Clara, CA (US)

(73) Assignee: Broadcom Corporation, Irvine, CA (US)

(*) Notice: Subject to any disclaimer, the term of this patent is extended or adjusted under 35 U.S.C. 154(b) by 147 days.

This patent is subject to a terminal disclaimer.

(21) Appl. No.: 11/905,468

(22) Filed: Oct. 1, 2007

(65) Prior Publication Data

US 2008/0107260 A1    May 8, 2008

Related U.S. Application Data

(63) Continuation of application No. 09/916,557, filed on Jul. 26, 2001, now Pat. No. 7,277,542.

(60) Provisional application No. 60/235,190, filed on Sep. 25, 2000.

(51) Int. Cl.
    *H04L 9/00* (2006.01)
(52) U.S. Cl. .................. 380/29; 380/43; 380/259
(58) Field of Classification Search .......... 380/37, 380/42, 259, 28
    See application file for complete search history.

(56) References Cited

U.S. PATENT DOCUMENTS

| | | | |
|---|---|---|---|
| 5,297,206 A | 3/1994 | Orton | |
| 5,623,548 A * | 4/1997 | Akiyama et al. | 380/28 |
| 5,790,817 A * | 8/1998 | Asghar et al. | 710/311 |
| 5,796,836 A | 8/1998 | Markham | |
| 5,870,474 A | 2/1999 | Wasilewski et al. | |
| 5,936,967 A | 8/1999 | Baldwin et al. | |
| 5,943,338 A | 8/1999 | Duclose et al. | |
| 6,111,858 A | 8/2000 | Greaves et al. | |
| 6,189,095 B1 * | 2/2001 | Coppersmith et al. | 713/150 |
| 6,209,077 B1 * | 3/2001 | Robertson et al. | 712/17 |
| 6,216,167 B1 | 4/2001 | Momirov | |
| 6,243,470 B1 * | 6/2001 | Coppersmith et al. | 380/259 |
| 6,477,646 B1 * | 11/2002 | Krishna et al. | 713/189 |
| 6,549,622 B1 | 4/2003 | Matthews | |
| 6,990,199 B2 | 1/2006 | Parker et al. | |
| 7,043,017 B2 | 5/2006 | Swindlehurst et al. | |

(Continued)

FOREIGN PATENT DOCUMENTS

EP    0 093 525    11/1983

(Continued)

OTHER PUBLICATIONS

Bruce Schneier: Book, title of the book, "Applied Cryptography" Chapter 17, Other Stream Ciphers and Real Random-sequence Generation (pp. 397-398) 1996.*

(Continued)

*Primary Examiner* — Gilberto Barron, Jr.
*Assistant Examiner* — Samson B Lemma
(74) *Attorney, Agent, or Firm* — Sterne Kessler Goldstein & Fox P.L.L.C.

(57) ABSTRACT

A system for encrypting and decrypting data formed of a number of bytes using the ARCFOUR encryption algorithm is disclosed. The system includes a system bus and an encryption accelerator arranged to execute the encryption algorithm coupled to the system bus. A system memory coupled to the system bus arranged to store a secret key array associated with the data and a central processing unit coupled to the system bus wherein encryption accelerator uses substantially no central processing unit resources to execute the encryption algorithm.

8 Claims, 8 Drawing Sheets

U.S. PATENT DOCUMENTS 7,277,542 B2    10/2007    Duval
7,403,615 B2 *    7/2008    Matthews, Jr. ............... 380/42

FOREIGN PATENT DOCUMENTS

| EP | 0 876 026 | 11/1998 |
|----|-----------|---------|
| EP | 895164 A2 * | 2/1999 |
| WO | WO 01/80483 | 10/2001 |

OTHER PUBLICATIONS

Analog Devices: "ADSP2141 SafeNetDPS User's Manual, Revision 6", Analog Devices Technical Specifications, Mar. 2000, XP002163401, 87 Pages.

C. Madson, R. Glenn: "RFC 2403- The Use of HMAC-MD5-96 within ESP and AH", IETF Request for Comments, Nov. 1998, XP002163402, Retrieved from Internet on Mar. 20, 2001, http://www.faqs.org/rfcs/frc2403.html, 87 Pages.

S. Kent, R. Atkinson: "RFC 2406-IP Encapsulating Security Payload (ESP)" IEFT Request for Comments, Nov. 1998, XP002163400, Retrieved from the Internet on Mar. 20, 2001, http://www.faqs.org/rfcs/frc2406.html, 5 Pages.

Keromytis, et al., "Implementing IPsec", Global Telecommunications Conference (Globecom), IEEE, Nov. 3, 1997, pp. 1948-1952.

Pierson, et al., "Context-Agile Encryption for High Speed Communication Networks", Computer Communications Review, Association for Computing Machinery, vol. 29, No. 1, Jan. 1999, pp. 35-49.

Sholander, et al., "The Effect of Algorithm-Agile Encryption on ATM Quality of Service", Global Telecommunications Conference (Globecom), IEEE, Nov. 3, 1997, pp. 470-474.

Smirni, et al., "Evaluation of Multiprocessor Allocation Policies", Technical Report, Vanderbilt University, Online, 1993, pp. 1-21.

Tarman, et al., "Algorithm-Agile Encryption in ATM Networks", IEEE Computer, Sep. 1998, vol. 31, No. 1, pp. 57-64.

Wassal, et al., "A VLSI Architecture for ATM Algorithm-Agile Encryption", Proceedings Ninth Great Lakes Symposium on VLSI, Mar. 4-6, 1999, pp. 325-328.

Analog Devices: "Analog Devices and IRE Announce First DSP-Based Internet Security System-On-A-Chip", Analog Devices Press Release, Online, Jan. 19, 1999, pp. 1-3. http://content.analog.com/pressrelease/prdisplay/0,1622,16,00.html.

3Com: "3Com Launces New Era of Network Connectivity", 3Com Press Release, Jun. 14, 1999, pp. 1-3.

"Secure Products VMS115", VLSI Technology, Inc., Printed in USA, Document Control: VMS115, VI, 0, Jan. 1999, pp. 1-2. VMS115 Data Sheet, VLSI Technology, Inc., a subsidiary of Philips Semiconductors, Revision 2:3, Aug. 10, 1999, pp. 1-64.

"VMS115 Data Sheet", VLSI Technology, Inc., a subsidiary of Philips Semiconductors, Revision 2:3, Aug. 10, 1999, pp. 1-64.

"Data Sheet 7751 Encryption Processor", Network Security Processors, Jun. 1999, pp. 1-84.

Senie, D., "NAT Friendly Application Design Guidelines", Amaranth Networks, Inc., Nat Working Group, Internet-Draft, Sep. 1999, pp. 1-7.

Floyd, Sally, et al., "Random Early Detection Gateways for Congestion Avoidance", Lawrence Berkeley Laboratory, University of California, IEEE/ACM Transactions on Networking, Aug. 1993, pp. 1-32.

Egevang, K., et al., "The IP Network Address Translator (NAT)", Network Working Group, May 1994, pp. 1-10.

Pall, G. S., et al., "Microsoft Point-To-Point Encryption (MPPE) Protocol", Microsoft Corporation, Network Working Group, Internet Draft, Oct. 1999, pp. 1-12.

Deutsch, P., "DEFLATE Compressed Data Format Specification Version 1.3", Aladdin Enterprises, Network Working Group, May 1996, pp. 1-17.

Kent, S., "IP Authentication Header", Network Working Group, Nov. 1998, pp. 1-22.

Kent, S., et al., "IP Encapsulating Security Payload (ESP)", Network Working Group, Nov. 1998, pp. 1-22.

Maughan, D, et al., "Internet Security Association and Key Management Protocol (ISAKMP)", Network Working Group, Nov. 1998, pp. 1-20.

Harkins, D., et al., "The Internet Key Exchange (IKE)", Cisco Systems, Network Working Group, Nov. 1998, pp. 1-12.

Srisuresh, P., "Security Model with Tunnel-mode Ipsec for NAT Domains", Lucent Technologies, Network Working Group, Oct. 1999, pp. 1-11.

Shenker, S., "Specification of Guaranteed Quality of Service", Network Working Group, Sep. 1997, pp. 1-20.

Srisuresh, P., et al., "IP Network Address Translator (NAT) Terminology and Considerations", Lucent Technologies, Network Working Group, Aug. 1999, pp. 1-30.

Kent, S., et al., "Security Architecture for the Internet Protocol", Network Working Group, Nov. 1998, pp. 1-66.

"Compression for Broadband Data Communications", BlueSteel Networks, Inc., Sep. 8, 1999, pp. 1-9.

"Securing and Accelerating e-Commerce Transactions", BlueSteel Networks, Inc., Revision 2.0, Oct. 20, 1999, pp. 1-7.

"Securing Broadband Communications" BlueSteel Networks, Inc., Sep. 8, 1999, pp. 1-10.

"Applied Cryptography, Second Edition", Schneider, B., 1996, John Wiley & Sons, New York, XP002184521, cited in the application, p. 442, paragraph 18.7—p. 445.

"SHA: The Secure Hash Algorithm Putting Message Digests to Work", Stallings, W., Dr. Dobbs Journal, Redwood City, CA, Apr. 1, 1994, p. 32-34, XP000570561.

R. Sedgewick, "Algorithms in C—Third Edition", 1998, Addison Wesley XP002163543, pp. 573-608.

Search Report dated Apr. 29, 2003 from corresponding European Patent Application No. 01308059.3 filed Sep. 21, 2001.

Schneier, B.; Applied Cryptography, Other Stream Ciphers and Real Random-Sequence Generators; Applied Cryptography, Protocols, Algorithms, and Source Code in C, New York, New York; John Wiley & Sons, 1996; p. 397-398, XP002223345.

* cited by examiner

STREAM CIPHER ENCRYPTION APPLICATION ACCELERATOR AND METHODS THEREOF

CROSS REFERENCE TO RELATED APPLICATIONS

This application is a continuation of U.S. patent application Ser. No. 09/916,557, entitled "Stream Cipher Encryption Application Accelerator and Methods Thereof, filed on Jul. 26, 2001 which claims benefit under U.S.C. 119(e) from U.S. Provisional Patent Application No. 60/235,190 entitled "E-Commerce Security Processor" filed on Sep. 25, 2000 each of which is incorporated by reference in its entirety for all purposes.

BACKGROUND OF THE INVENTION

1. Field of the Invention

The present invention relates to a deployed cryptographic application in a distributed computing environment. More specifically, a stream cipher encryption algorithm accelerator and methods of use thereof is described.

2. Description of the Prior Art

Electronic Commerce (e-commerce) is not possible if the parties cannot authenticate each other or if the transaction can be altered by some malicious third party. Accordingly, there is a large body of experience in developing and deploying encryption applications, especially in the HTML/HTTP browser/server markets. One such application is referred to as "RC4" which is a trademark of RSA Security Inc of Redwood City, Calif. RC4™ is a secure, variable key-size stream cipher with byte-oriented operations. The RC4™ algorithm is based on the use of a random permutation having a period that is overwhelmingly likely to be greater than $10^{100}$. Typically, eight to sixteen machine operations are required per output byte. More specifically, RC4™ uses a variable length key from 1 to 256 bytes to initialize a 256-byte state table. The state table is used for subsequent generation of pseudo-random bytes and then to generate a pseudo-random stream which is XORed with the plaintext to give the ciphertext. Each element in the state table is swapped at least once.

For seven years, RC4™ was proprietary and details of the algorithm were only available after signing a nondisclosure agreement. However, in September, 1994 someone anonymously posted source code (referred to as "Alleged RC4", or more commonly referred to as ARCFOUR) to a user group mailing list. ARCFOUR quickly spread to various Usenet newsgroups and, ultimately, via the Internet to ftp sites around the world. Readers with legal copies of RC4 confirmed compatibility between ARCFOUR and RC4™ owned by RSA Data Security, Inc. which tried unsuccessfully to claim that ARCFOUR was a trade secret even though it was public. Consequently, ARCFOUR has become the defacto standard for online encryption and has become one of the most popular encryption algorithms in the browser market.

Currently, in order to encrypt (or decrypt) data using the ARCFOUR algorithm a central processing unit (CPU) type system 100 as illustrated in FIG. 1 is typically used. For example, the conventional system 100 includes a CPU 102 coupled to a first memory array 104 used to store a secret key(s) and a second memory array 106 used to store an incrementing pattern by way of an interface 108. The CPU 102 is also connected to a state array unit 110 and a data storage device 112, such as a register, memory device, and so on, used to store a message 114 to be, in this example, encrypted using the ARCFOUR algorithm. In order to encrypt the message 114, a process 200 as shown by the flowchart illustrated in FIG. 2 is used. First, the CPU 102 performs a mixing operation by, at 202, storing an incrementing pattern in the second memory array 106 and a secret key (or keys) in the first memory array 104. Next, at 204, the CPU 102 performs a shifting operation based upon the key values stored in the first memory array 104 and at 206 updates the state array 110 thereby completing the mixing operation. After the mixing operation is complete, the CPU 102 performs a ciphering operation at 208 on each byte of the message 112 until such time as the encrypted message is ready to be transmitted to a receiver. It should be noted that a received encrypted message is decrypted in a substantially similar manner.

Although a powerful tool for providing a secure e-commerce transaction environment, the use of a CPU based encryption/decryption system requires a substantial amount of CPU resources thereby severely restricting the CPU for other purposes. This reliance on the CPU to carry out and/or direct the many steps required to encrypt or decrypt a message greatly reduces the efficiency of any system relying upon a CPU to operate in a secure transaction environment.

Therefore what is desired is an efficient encryption accelerator and methods of use thereof that off loads most, if not all, of the encryption/decryption operations from a system CPU. In particular, the efficient encryption accelerator is most appropriate for use in a secure e-commerce transaction carried out over an unsecure network of distributed computing devices, such as the Internet.

SUMMARY OF THE INVENTION

An efficient encryption system and encryption accelerator are disclosed. In particular, the encryption system and encryption accelerator is most appropriate for use in executing a secure e-commerce transaction carried out over an unsecure network of distributed computing devices, such as the Internet.

In one embodiment, a system for encrypting and decrypting data formed of a number of bytes using an encryption algorithm is disclosed. The system includes a system bus and an encryption accelerator arranged to execute the encryption algorithm coupled to the system bus. A system memory coupled to the system bus arranged to store a secret key array associated with the data and a central processing unit coupled to the system bus wherein encryption accelerator uses substantially no central processing unit resources to execute the encryption algorithm.

In another embodiment an encryption accelerator produces an initial incrementing state memory pattern totally in hardware whereas the shuffling operation is performed by transferring the secret key data in bytes into the accelerator via an external interface. It should be noted that the shuffling operation is performed on the fly as the key data transfer takes place. After the state memory shuffling operation has been completed, the data that is to be encrypted (or decrypted) is transferred to the accelerator through the external interface. For each byte of date the accelerator produces a byte from the state memory which is exclusive-OR'd with the byte of data. The state memory is then shuffled further through a data dependent swapping operation.

In a preferred embodiment, the accelerator uses the ARCFOUR encryption algorithm and is capable of operating in a number of modes. One such mode is arranged to accommodate an interruption of the processing of a first data stream to process a second, orthogonal data stream. After completion of the processing of the second data stream, the first data stream processing is restarted where it originally left off.

These and other features and advantages of the present invention will be presented in more detail in the following specification of the invention and the accompanying figures that illustrate by way of example the principles of the invention.

BRIEF DESCRIPTION OF THE DRAWINGS

The invention may best be understood by reference to the following description taken in conjunction with the accompanying drawings.

DETAILED DESCRIPTION OF SPECIFIC EMBODIMENTS

Figure 1:
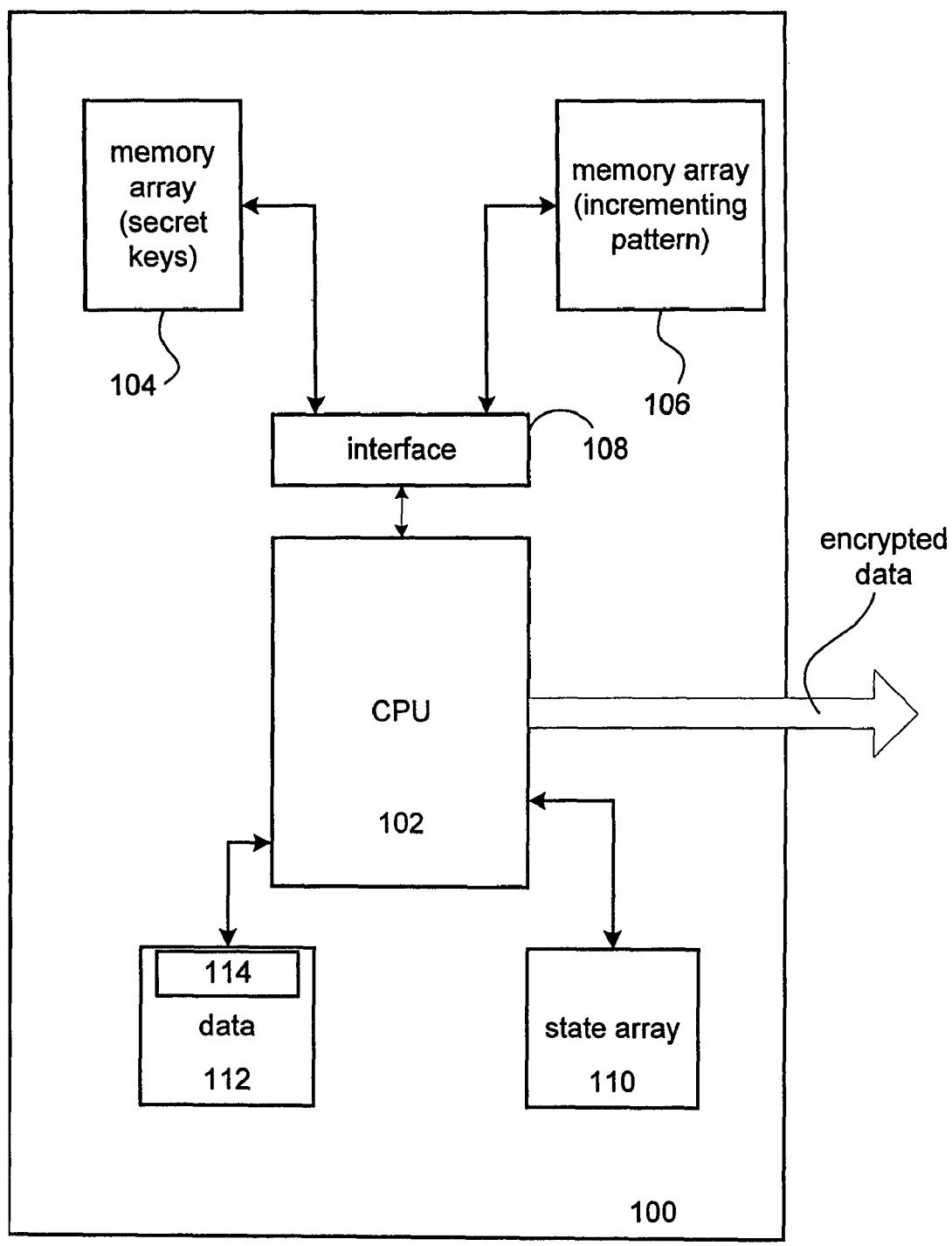
FIG. 1 illustrates a conventional CPU based encryption/decryption system.
Figure 2:
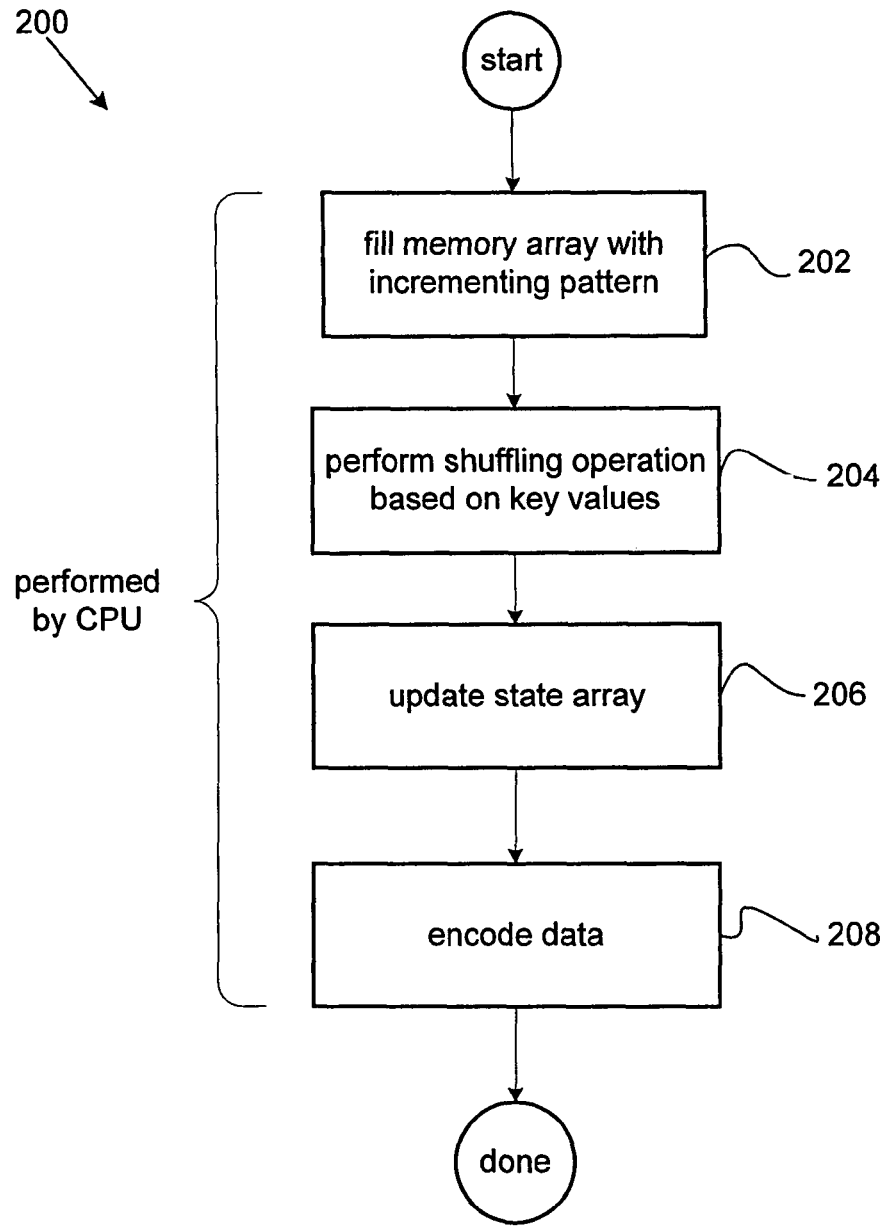
FIG. 2 shows a flowchart detailing a process for encrypting a message using an ARCFOUR encryption process.

Reference will now be made in detail to a preferred embodiment of the invention. An example of the preferred embodiment is illustrated in the accompanying drawings. While the invention will be described in conjunction with a preferred embodiment, it will be understood that it is not intended to limit the invention to one preferred embodiment. To the contrary, it is intended to cover alternatives, modifications, and equivalents as may be included within the spirit and scope of the invention as defined by the appended claims.

In the described embodiment, the inventive encryption accelerator implements the ARCFOUR algorithm by requiring that a 256 byte state memory be initialized with an incrementing pattern (i.e., location 0 contains the value 0, location 1 contains the value 1, and so on). A key, consisting of one to 256 bytes where each byte is 8 bits, is then used to move the state memory values to new locations in a shuffling operation. The values in the state memory at the end of this operation consist of the numbers 0 through 255, but the locations of those values are only known if the key is known. In this way, this inventive accelerator produces the initial incrementing state memory pattern totally in hardware whereas the shuffling operation is performed by transferring the key data, modulo key length in bytes into the accelerator via an external interface. It should be noted that the shuffling operation is performed on the fly as the key data transfer takes place.

After the state memory shuffling operation has been completed, the data that is to be encrypted (or decrypted) is transferred to the accelerator through the external interface. For each byte of data the accelerator produces a byte from the state memory that is exclusive-OR'd with the byte of data to produce the encrypted byte of data. The state memory is then shuffled further through a data dependent swapping operation.

It should be noted that in addition to relieving a system CPU from performing at least the initial incrementing state memory pattern, the inventive encryption accelerator is capable of accommodating multiple streams of data by, for example, operating in multiple modes. These operation modes include an Initial Mode and a Continuation Mode. When the accelerator is operation in the Initial Mode, the operations described above are performed sequentially, whereas in the Continuation mode, the state memory is loaded with the contents of the state memory that were saved when an earlier stream of data was interrupted. In either mode, when a Last Transfer flag is not set, the contents of the state memory are saved externally to the accelerator.

The invention will now be described in terms of an encryption/decryption accelerator system that can be implemented in a number of ways, such as for example, as a stand alone integrated circuit, as embedded software, or as a subsystem included in, for example, a server computer used in a variety of Internet and Internet related activities. It should be noted, however, that the invention is not limited to the described embodiments and can be used in any system where high speed encryption is desired.

Figure 3:
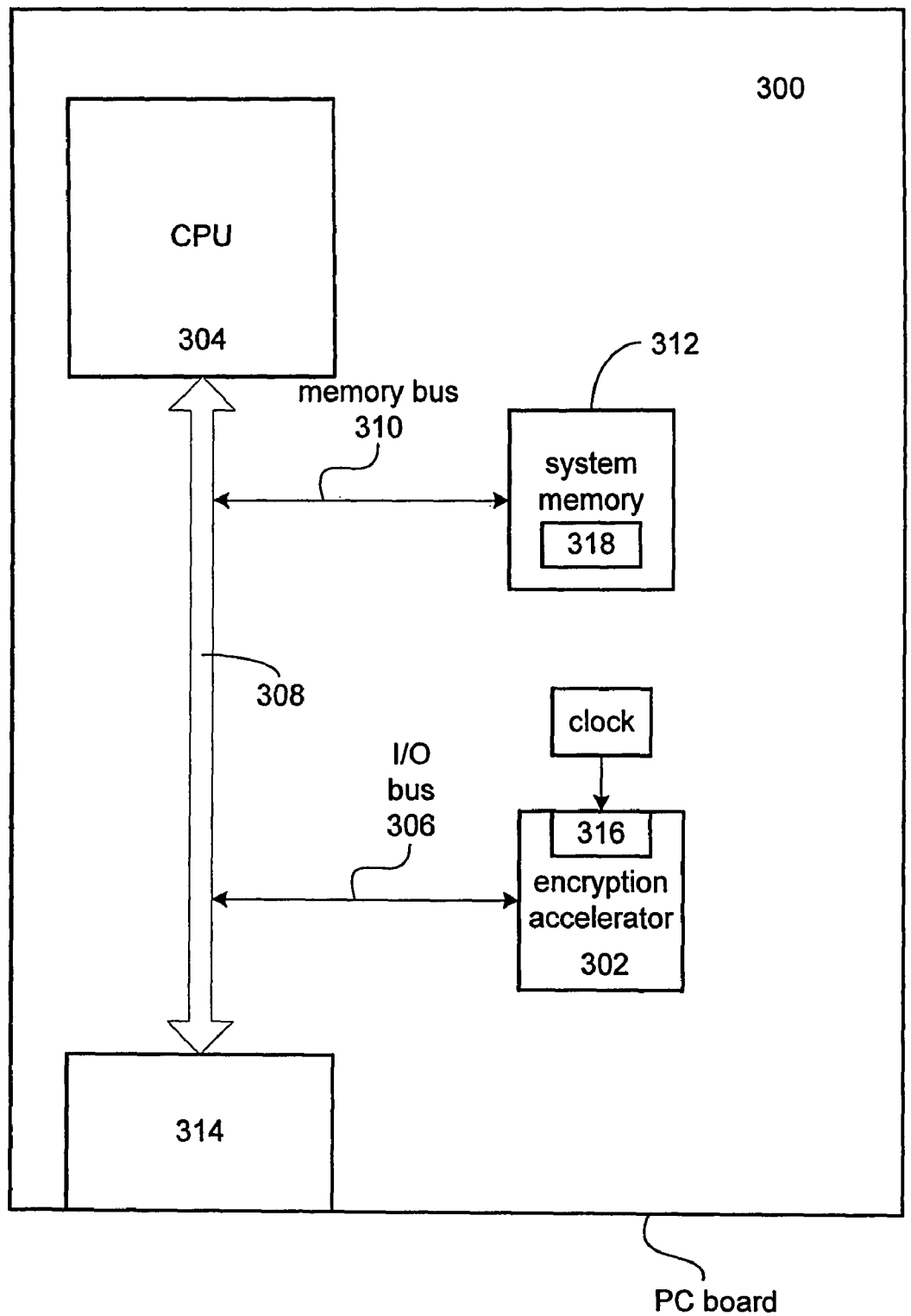
FIG. 3 shows a system having an encryption accelerator coupled to a central processing unit in accordance with an embodiment of the invention.

FIG. 3 shows a system 300 having an encryption accelerator 302 coupled to a central processing unit 304 in accordance with an embodiment of the invention. In the described system 300, the encryption accelerator 302 is coupled to the CPU 304 by way of an I/O bus 306 that is, in turn, coupled to a system bus 308. Also coupled to the system bus 308 by way of a memory bus 310 is a system memory 312 arranged, in this implementation, to store a secret key (or keys) corresponding to a particular message (or messages) to be encrypted (or decrypted). It should be noted, that for the remainder of this discussion, it is well known that the act of encryption and decryption are symmetric and therefore any discussion of encryption in the ARCFOUR algorithm applies equally as well to the act of decryption for the same message.

Although not shown for sake of clarity, a buffer or other such storage device can be used to intermittently store the message to be encrypted at a point that is in temporal proximity to the accelerator 302 thereby improving system 300 performance. Such a storage device can include a FIFO type buffer or buffers used to store, for example, the message to be encrypted or the encrypted message prior to being transmitted to an I/O port 314 coupled to external circuitry.

During operation, the inventive encryption accelerator 302 implements the ARCFOUR algorithm by requiring that a state memory 316 be initialized with an incrementing pattern (i.e., location 0 contains the value 0, location 1 contains the value 1, and so on). In the described embodiment, the state memory 316 is 256 bytes in size. In a shuffling operation, a secret key array 318 that is stored in the system memory 312 is used to move state memory values to new locations in the state memory 316. In the described embodiment, the secret key array 318 consists of 256 bytes, where each byte is 8 bits. The secret key array 318 is produced by repeating the secret key until 256 bytes are filled. In this way, the values in the state memory 316 at the end of the shuffling operation consist of the numbers 0 through 255, but the locations of those values in the state memory 316 are only known if the secret key array 318 is known. In this way, this inventive accelerator 302 produces the initial incrementing state memory pattern totally in hardware whereas the shuffling operation is performed by transferring the secret key array 318 and an associated message data length (in bytes) into the accelerator 302 via the system bus 308 and any intervening external interfaces thereby preserving valuable CPU resources. It should be noted that the shuffling operation in the state memory 316 is performed "on the fly" as transfer of the secret key array 318 takes place.

After the state memory shuffling operation has been completed, the data that is to be encrypted is transferred to the accelerator 302 through the system bus 308. For each byte of data the accelerator 302 produces a byte from the state memory 316 which is exclusive-OR'd with the corresponding byte of data to be encrypted. The state memory 316 is then shuffled further through a data dependent swapping operation.

Figure 4:
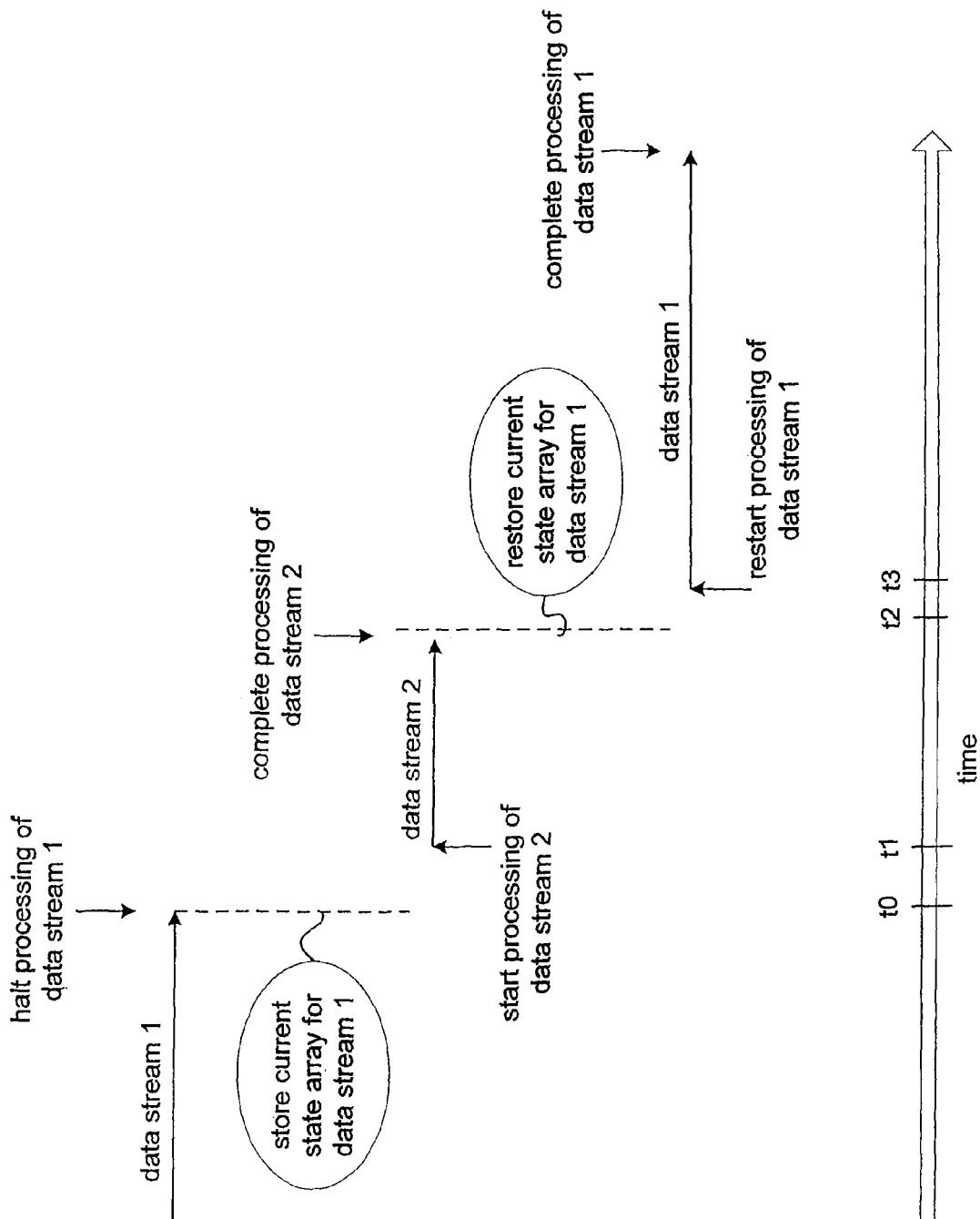
FIG. 4 shows a particular implementation of the encryption accelerator shown in FIG. 3.

As noted above, the encryption accelerator 302 is capable of operating in multiple modes that include an Initial Mode and a Continuation Mode. When the accelerator is operation in the Initial Mode, the operations described above are performed sequentially. However, as shown in FIG. 4, when in the Continuation mode, the state memory 316 is reloaded with the contents of the state memory 316 that were saved to external memory (such as the system memory 312, if so desired) when a Last Transfer flag is not set when an earlier stream of data was interrupted. For example, when the accelerator 302 is processing a first data stream that is interrupted at t=t0, the contents of the state memory 316 as it stood at t=t0 are stored externally (if the Last Transfer flag is not set) and processing of a second data stream is then commenced at approximately t=t1. At the completion of the processing of the second data stream at t=t2, the contents of the state memory 316 as it stood at t=t0 corresponding to state of processing of the interrupted first data stream at t=t0 is restored to the state memory 316. At this point, the processing of the first data stream can be restarted at approximately t=t3.

Figure 5:
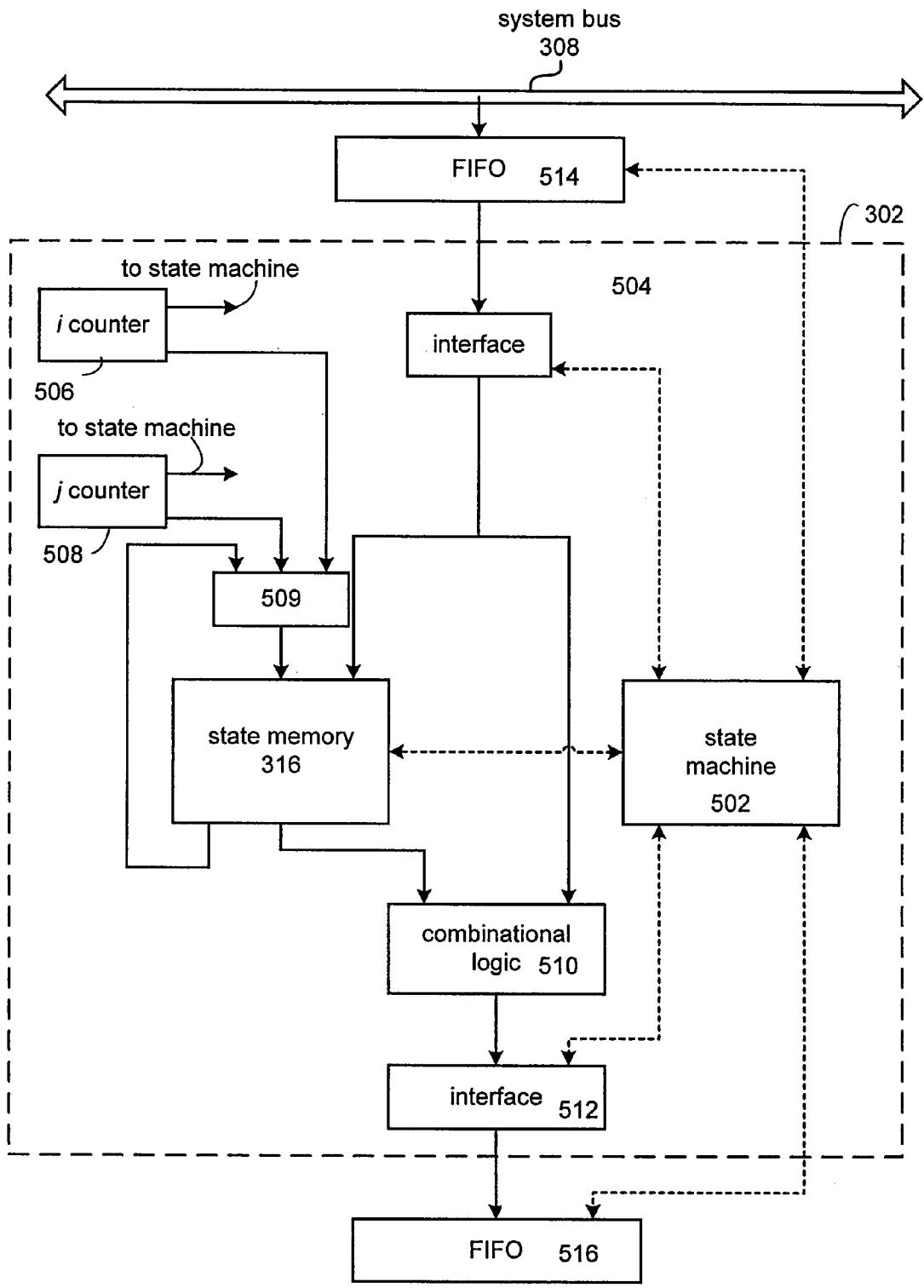
FIG. 5 shows a particular implementation of the encryption accelerator in accordance with an embodiment of the invention that includes a state machine coupled to the state memory and an input interface.

FIG. 5 shows a particular implementation of the encryption accelerator 302 in accordance with an embodiment of the invention that includes a state machine 502 coupled to the state memory 316 and an input interface 504. The accelerator 302 also includes an index I counter 506 and an index J counter 508 each coupled to the state machine 502 and a combinational logic block 509. A combinational logic block 510 is coupled to the state memory 316 and the state machine 502 as well as an output interface 512. In the described embodiment, when the accelerator 302 is performing the ARCFOUR algorithm, the combinational logic block 510 is configured to operate as an exclusive OR logic block. As noted above, in order to further improve throughput, an input FIFO 514 and an output FIFO 516 each coupled to the state machine 502 and the system bus 308 are provided to latch the data to be encrypted (on the input side) and the encrypted data (on the output side).

During operation, the state machine 502 directs the shuffling operation in the state memory 316 by causing the secret key array 318 to be retrieved from the system memory 312 and directing the counters 506 and 508 to increment the indices (i, j) accordingly. In this way, the shuffling operations are completely performed by the accelerator 302 thereby preserving valuable CPU resources.

Once the state machine has determined that the shuffling operation has been successfully completed, the state machine 502 determines that when data to be encrypted is stored in the input FIFO 514, that on a byte wise basis, the data to be encrypted is passed by way of the input interface to the combination logic block where, in this example, it is exclusive OR'd with the contents of the state memory 316. The result of this exclusive OR'ing operation represents an encrypted byte which is then passed to the output FIFO 516.

The state machine 502 then determines if there are additional bytes to be encrypted and if so determined, directs the accelerator 302 to act accordingly.

Again, as described above, when in continuation mode, if a second data stream is to be processed, the state machine 502 directs that the contents of the state memory 316 be stored externally (if the last transfer flag is not set) until such time as the second data stream has been completely processed by the accelerator 302. At this point, the state machine 502 directs that the stored values of the state memory 316 corresponding to the last state of the processing of the first data stream be restored to the state memory 316 and then restarts processing of the interrupted first data stream.

Figure 6:
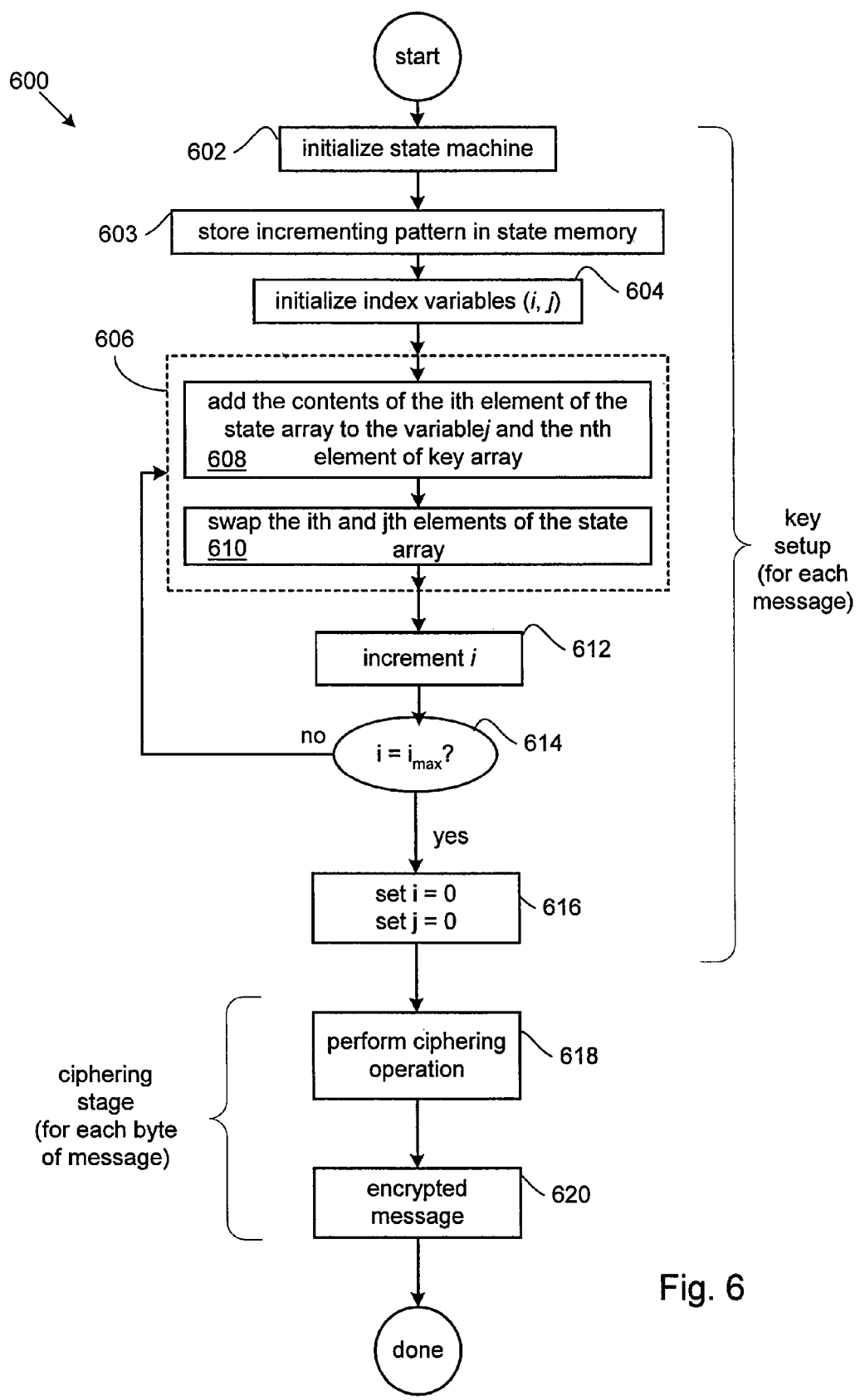
FIG. 6 shows a flowchart detailing a process for implementing the ARCFOUR algorithm by the accelerator in accordance with an embodiment of the invention.

FIG. 6 shows a flowchart detailing a process 600 for implementing the ARCFOUR algorithm by the accelerator 302 in accordance with an embodiment of the invention. The process 600 begins at 602 where the state machine is initialized. Next, at 603, an incrementing pattern is stored in the state memory. Next at 604, the index variables i and j are initialized. At 606, the state machine directs a shuffling operation that includes, at 608, adding the contents of the $i^{th}$ element of the state memory to the variable j and the nth element of the secret key array. Next, at 610 the $i^{th}$ and $j^{th}$ elements of the state memory are swapped. At 612, the $i^{th}$ index variable is incremented, and at 614 a determination is made whether or not the incremented index variable i is greater than the maximum allowable value. If the incremented index variable i is not greater than the max value, then the shuffling operation 606 continues, otherwise, the index variables i and j are initialized at 616 thereby completing the key setup portion of the ARCFOUR algorithm.

Once the key setup portion is complete, a ciphering portion of ARCFOUR algorithm is performed at 618 on a data stream to be encrypted to form an encrypted data stream at 620.

Figure 7:
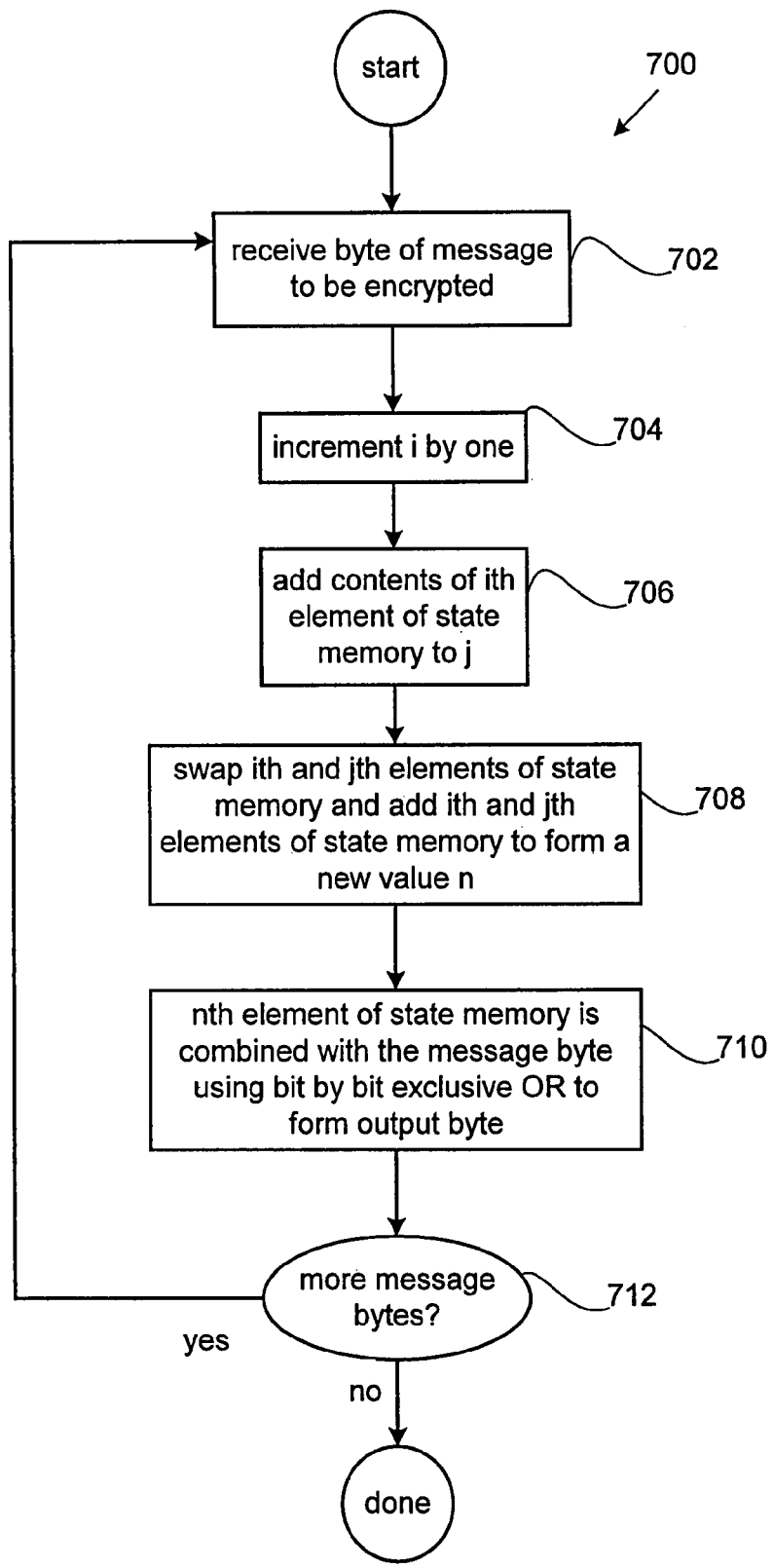
FIG. 7 shows a flowchart detailing a process for implementing the ciphering operation of the process shown in FIG. 6.

FIG. 7 shows a flowchart detailing a process 700 for implementing the ciphering operation 618 of the process 600 shown in FIG. 6. The process 700 begins at 702 by receiving a byte of the data to be encrypted and at 704 by incrementing the index variable i by one. Next, at 706, the contents of the $i^{th}$ element of the state memory is added to the $j^{th}$ element of the state memory while at 708 the $i^{th}$ and $j^{th}$ elements of the state memory are swapped. At 709, the $i^{th}$ and the $j^{th}$ elements of the state memory are added together to form a new value n. At 710, an encrypted output byte is formed by combining the nth element of the state memory with the data byte to be encrypted using a bit by bit exclusive OR operation. At 712, a determination is made whether or not there are additional bytes to be encrypted. If there are additional bytes, then control is passed back to 702, otherwise processing is stopped.

Figure 8:
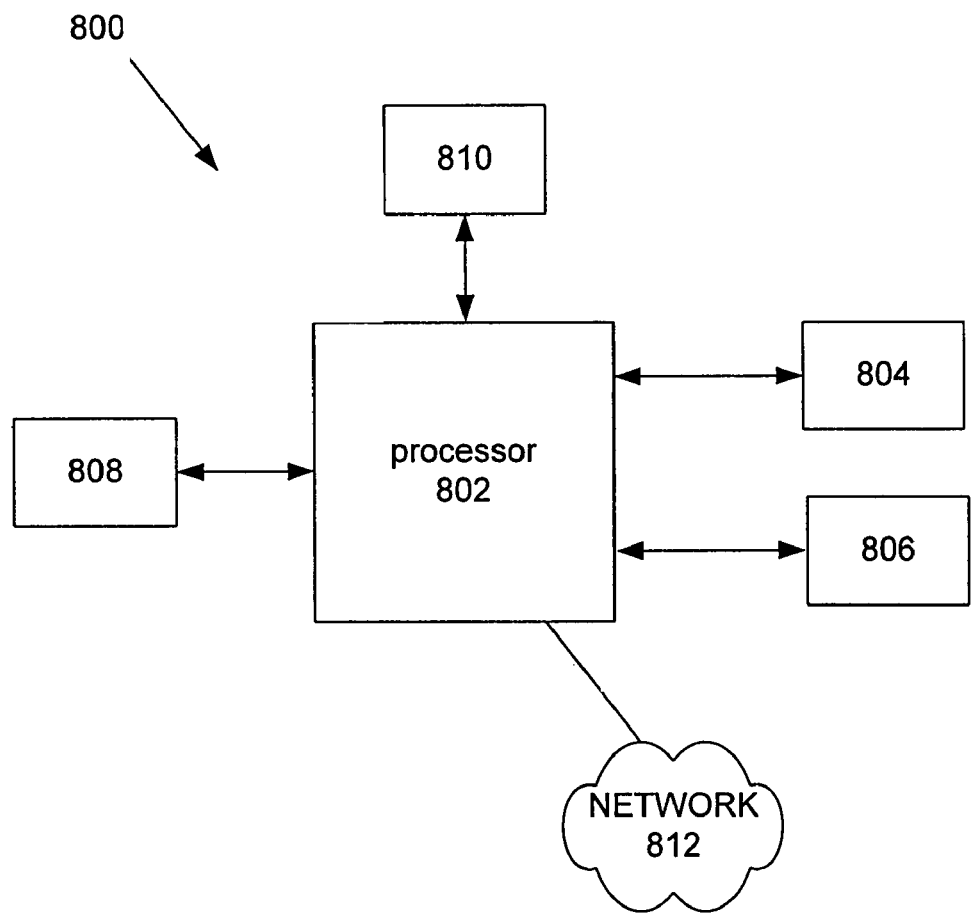
FIG. 8 illustrates a typical, general-purpose computer system suitable for implementing the present invention.

FIG. 8 illustrates a typical, general-purpose computer system 800 suitable for implementing the present invention. The computer system 800 includes at least one processor (CPU) 802 that is coupled to memory devices including primary storage devices 806 (typically a read only memory, or ROM) and primary storage devices 804 (typically a random access memory, or RAM).

Computer system 800 or, more specifically, CPUs 802, may be arranged to support a virtual machine, as will be appreciated by those skilled in the art. One example of a virtual machine that may be supported on computer system 800 will be described below with reference to FIG. 3. As is well known in the art, ROM acts to transfer data and instructions uni-directionally to the CPUs 802, while RAM is used typically to transfer data and instructions in a bi-directional manner. CPUs 802 may generally include any number of processors. Both primary storage devices 804, 806 may include any suitable computer-readable media. A secondary storage medium 808, which is typically a mass memory device, is also coupled bi-directionally to CPUs 802 and provides additional data storage capacity. The mass memory device 808 is a computer-readable medium that may be used to store programs including computer code, data, and the like. Typically, mass memory device 808 is a storage medium such as a hard disk or a tape which generally slower than primary storage devices 804, 806. Mass memory storage device 808 may take the form of a magnetic or paper tape reader or some other well-known device. It will be appreciated that the information retained within the mass memory device 808, may, in appropriate cases, be incorporated in standard fashion as part of RAM 806 as virtual memory. A specific primary storage device 804 such as a CD-ROM may also pass data uni-directionally to the CPUs 802.

CPUs 802 are also coupled to one or more input/output devices 810 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPUs 802 optionally may be coupled to a computer or telecommunications network, e.g., an internet network or an intranet network, using a network connection as shown generally at 812. With such a network connection, it is contemplated that the CPUs 802 might receive information from the network, or might output information to the network in the course of performing the above-described method steps. Such information, which is often represented as a sequence of instructions to be executed using CPUs 802, may be received from and outputted to the network, for example, in the form of a computer data signal embodied in a carrier wave. The above-described devices and materials will be familiar to those of skill in the computer hardware and software arts.

While the invention has been particularly shown and described with reference to specific embodiments thereof, it will be understood by those skilled in the art that changes in the form and details of the disclosed embodiments may be made without departing from the spirit or scope of the invention. For example, the embodiments described above may be implemented using firmware, software, or hardware. Moreover, embodiments of the present invention may be employed with a variety of communication protocols and should not be restricted to the ones mentioned above. Therefore, the scope of the invention should be determined with reference to the appended claims.

What is claimed is:

1. A method for performing an RC4 stream cipher on an input data stream in an encryption accelerator, comprising:
    initializing an RC4 substitution box in a state memory, wherein the substitution box initialization includes:
        storing an incrementing pattern of values in incrementing memory locations in the state memory, and
        shuffling, upon direction of a state machine within the encryption accelerator, the values among the memory locations in the state memory based on a received key array having a plurality of portions, wherein the shuffling is performed with receipt of each portion of the key array by the encryption accelerator whereby an initial shuffled pattern of substitution values is generated via hardware and stored in a plurality of memory locations in the state memory; and
    generating, upon direction of the state machine, a random byte using the shuffled substitution box according to an RC4 cipher operation,
    wherein no central processing unit resources are invoked to perform the shuffling and generating components of the RC4 stream cipher.

2. The method of claim 1, wherein initializing the RC4 substitution box further comprises:
    receiving the key array from a system memory via an interface to an external to the encryption accelerator.

3. The method of claim 1, further comprising:
    combining the random byte with a portion of an input data stream received in the encryption accelerator to generate an encrypted data input byte.

4. The method of claim 1, further comprising:
    receiving an interrupt;
    storing a state of the state memory for the first input data stream in an external memory; and
    performing an RC4 stream cipher on a second input data stream.

5. The method of claim 4, further comprising:
    restoring the state of first input data stream in the state memory; and
    resuming the RC4 stream cipher on the first input data stream.

6. A system performing an RC4 stream cipher on an input data stream:
    a system memory arranged to store a key array associated with the input data stream; and
    an encryption accelerator having a state machine and a state memory, wherein the encryption accelerator configured to execute the RC4 stream cipher upon direction of the state machine including performing an RC4 shuffling operation using a portion of the key array received from the system memory,
    wherein no central processing unit resources are invoked to perform the shuffling operation of the RC4 stream cipher, and
    wherein the encryption accelerator is further configured to perform the RC4 shuffling operation concurrently with the receipt of each portion of the key array by the encryption accelerator whereby an initial shuffled pattern of substitution values is generated via hardware and stored in a plurality of memory locations in the state memory.

7. The system of claim 6, wherein the encryption accelerator is configured to store a current state of the state memory in the external system memory upon receipt of an interrupt request.

8. The system of claim 7, wherein the encryption accelerator is selectively operable in an Initial Mode and a Continuation mode wherein the Initial Mode the system operates in a sequential manner whereas in the continuation mode the state memory is reloaded with the stored state from the external system memory.

* * * * *

UNITED STATES PATENT AND TRADEMARK OFFICE
CERTIFICATE OF CORRECTION

| | | |
|---|---|---|
| PATENT NO. | : 7,903,813 B2 | Page 1 of 1 |
| APPLICATION NO. | : 11/905468 | |
| DATED | : March 8, 2011 | |
| INVENTOR(S) | : Donald E. Duval | |

It is certified that error appears in the above-identified patent and that said Letters Patent is hereby corrected as shown below:

Column 8, line 14, please delete "to an".

Signed and Sealed this
Thirty-first Day of May, 2011

David J. Kappos
*Director of the United States Patent and Trademark Office*